United States Patent
Matsumoto

(10) Patent No.: US 8,230,890 B2
(45) Date of Patent: Jul. 31, 2012

(54) PNEUMATIC TIRE WITH TREAD HAVING SEE-THROUGH MAIN GROOVE WITH AMPLITUDE, BLOCKS AND SUB-GROOVES

(75) Inventor: Kenichi Matsumoto, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 493 days.

(21) Appl. No.: 12/476,657

(22) Filed: Jun. 2, 2009

(65) Prior Publication Data

US 2009/0320981 A1    Dec. 31, 2009

(30) Foreign Application Priority Data

Jun. 26, 2008 (JP) ................................ 2008-167859
May 1, 2009 (JP) ................................ 2009-112084

(51) Int. Cl.
*B60C 11/03*    (2006.01)
*B60C 11/12*    (2006.01)
*B60C 11/13*    (2006.01)

(52) U.S. Cl. .......... 152/209.2; 152/209.22; 152/209.27; 152/DIG. 3

(58) Field of Classification Search .............. 152/209.2, 152/209.18, 209.22, 209.27, DIG. 3
See application file for complete search history.

(56) References Cited

U.S. PATENT DOCUMENTS

| | | | |
|---|---|---|---|
| 5,526,860 A * | 6/1996 | Minami | 152/209.18 |
| 6,311,748 B1 * | 11/2001 | Boiocchi et al. | 152/209.2 |
| 6,527,023 B1 | 3/2003 | Takahashi | |
| 2002/0144762 A1 * | 10/2002 | Peda et al. | 152/209.8 |
| 2003/0192634 A1 * | 10/2003 | Hino | 152/209.18 |
| 2006/0060276 A1 * | 3/2006 | Hashimoto et al. | 152/209.18 |
| 2009/0107601 A1 * | 4/2009 | Niknam et al. | 152/209.18 |

FOREIGN PATENT DOCUMENTS

| | | | |
|---|---|---|---|
| JP | 10-100617 A | * | 4/1998 |
| JP | 2001-253213 A | | 9/2001 |
| JP | 2002-059710 A | * | 2/2002 |

OTHER PUBLICATIONS

Machine translation for Japan 2002-059710 (no date).*
Machine translation for Japan 10-100617 (no date).*

* cited by examiner

*Primary Examiner* — Steven D Maki
(74) *Attorney, Agent, or Firm* — Global IP Counselors, LLP

(57) ABSTRACT

A pneumatic tire is provided for enhancing its driving stability and braking performance on particular road surfaces. The pneumatic tire is provided with five main grooves, first and second lateral grooves, and first and second blocks. The five main grooves include a single first main groove, two second main grooves, and two third main grooves. The single first main groove is disposed on a tire equator. The first main groove is made of a see-through groove extending in the tire circumferential direction. The two second main grooves are disposed on two sides of the first main groove in the tire width direction. The first and the second lateral grooves are extending in the tire width direction. The first and the second blocks are formed in a center area of the tread surface between the two third main grooves. A sub-groove is disposed in each first block.

12 Claims, 2 Drawing Sheets

PNEUMATIC TIRE WITH TREAD HAVING SEE-THROUGH MAIN GROOVE WITH AMPLITUDE, BLOCKS AND SUB-GROOVES

BACKGROUND OF THE INVENTION

1. Field of the Invention

The present invention relates to a pneumatic tire, and specifically to a pneumatic tire which has an improved driving stability on a dry road surface and an improved braking performance on a wet road surface.

2. Description of the Related Art

In general, pneumatic tires used for sport utility vehicles (SUVs) or the like employ a block pattern on their tread surfaces so as to secure their performance of running in river terrains, muddy terrains and the like (see Japanese patent application Kokai publication No. 2001-253213, for example).

On the other hand, the safety performance of pneumatic tires has been requested to be further enhanced along with higher performance of vehicles. Pneumatic tires used for the SUVs or the like are no exception to this request, and thus the safety performance thereof is requested to be enhanced.

What are particularly requested to be enhanced are the driving stability on dry road surfaces, and the braking performance on wet road surfaces. In this respect, if a lateral groove component extending in the tire width direction in the tread surface is increased, it is possible to enhance the braking performance on wet road surfaces. However, this increase deteriorates the driving stability on dry road surfaces, because the increase reduces the rigidity of each block in the tread surface. For this reason, it is difficult to satisfy the driving stability on dry road surfaces and the braking performance on wet road surfaces at the same time.

SUMMARY OF THE INVENTION

An object of the present invention is to provide a pneumatic tire capable of enhancing its driving stability on dry road surfaces and its braking performance on wet road surfaces.

A pneumatic tire according to the present invention made for the purpose of achieving the object includes five main grooves which are disposed in its tread surface at predetermined intervals in its tire width direction, each main groove extending in its tire circumferential direction. The five main grooves include a single first main groove, two second main grooves and two three main grooves. The single first main groove is disposed on an equator of the tire. The two second main grooves are disposed on the two respective sides of the first main groove in the tire width direction. Each of the two third main grooves is disposed on the outer side of its neighboring second main groove in the tire width direction. First lateral grooves each extending in the tire width direction are disposed between the first main groove and each second main groove at predetermined intervals in the tire circumferential direction. Second lateral grooves each extending in the tire width direction are disposed between each second main groove and its neighboring third main groove at predetermined intervals in the tire circumferential direction. First blocks and second blocks are formed in a center area of the tread surface between the two third main grooves. The first blocks are defined by the first main groove, the second main grooves and the first lateral grooves. The second blocks are defined by the second main grooves, the third main grooves and the second lateral grooves. The pneumatic tire according to the present invention is characterized in that: the first main groove is made of a see-through groove extending in the tire circumferential direction with amplitude in the tire width direction, one end of the see-through groove being capable of being seen through the see-through groove from the other end of the see-through groove when the tread surface around the tire is assumed to be developed in a plane; the length of each first block in the tire circumferential direction is set longer than that of each second block in the tire circumferential direction by making the intervals of the first lateral grooves longer than the intervals of the second lateral grooves; one sub-groove extending in the tire width direction is disposed in each first block; and one end of the sub-groove communicates with one of the second main grooves while the other end of the sub-groove is located inside the first block.

The present invention above-described makes the length of each first block in the tire circumferential direction longer than the length of each second block in the tire circumferential direction, and keeps the sub-groove provided in each first block from communicating with the first main groove. Consequently, the present invention is capable of increasing the rigidity of a tire equation-side portion of each first block in the tire circumferential direction, and is accordingly capable of enhancing the driving stability on dry road surfaces.

Furthermore, the present invention makes the first main groove provided on the tire equator exert its edge effect on the basis of edge components in the tire width direction which the first main groove acquires by extending in the tire circumferential direction with amplitude. On the other hand, the present invention secures drainage for the pneumatic tire because the first main groove is made of the see-through groove, and concurrently because the sub-groove communicating with the second main groove is disposed in each first block. Consequently, the present invention is capable of enhancing the braking performance of the pneumatic tire on wet road surfaces.

DETAILED DESCRIPTION OF THE PREFERRED EMBODIMENTS

Figure 1:
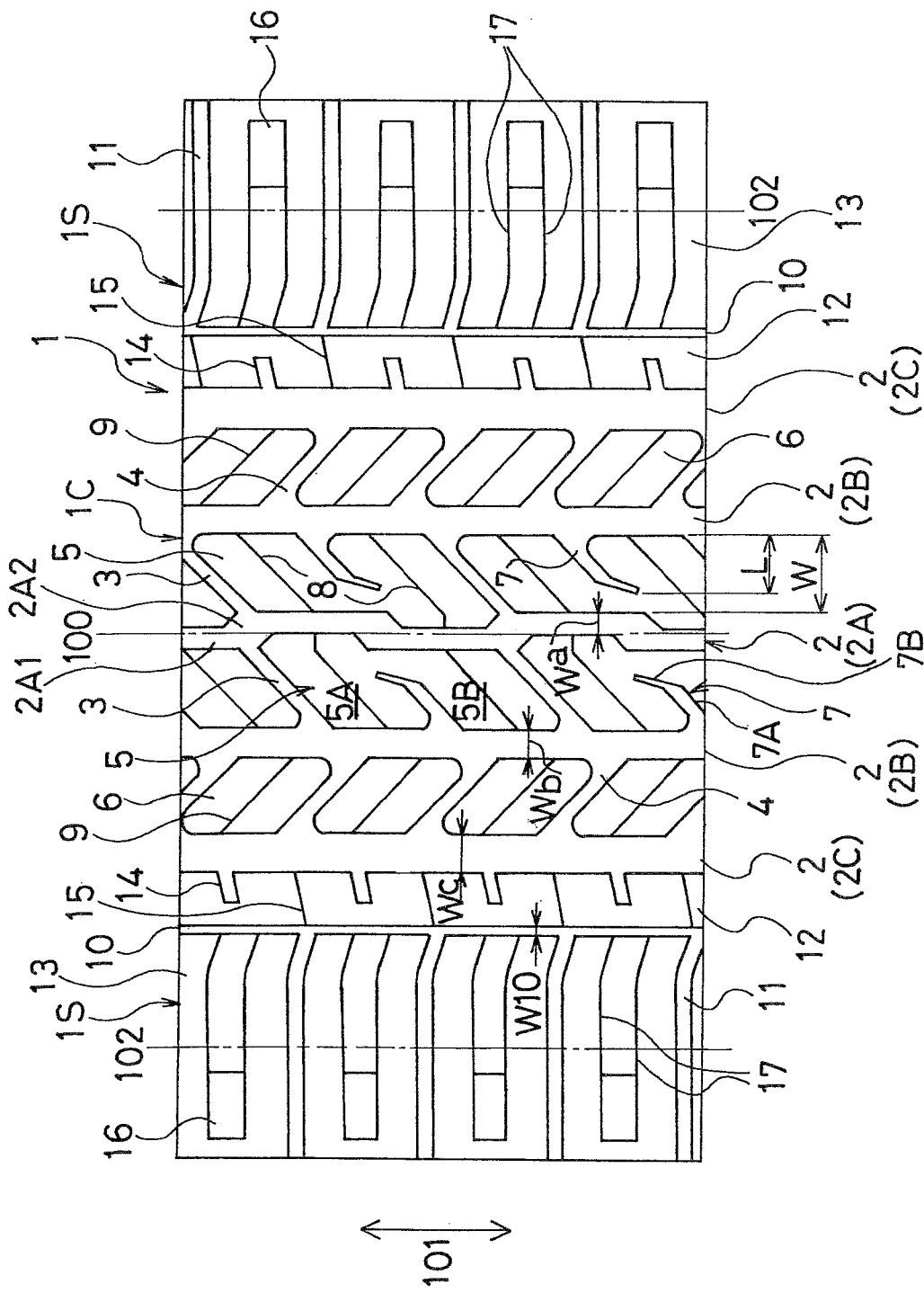
FIG. 1 is an exploded view of a part of a tread surface, which shows an embodiment of a pneumatic tire according to the present invention.

Referring to the drawings, detailed descriptions will be hereinbelow provided for the embodiment of the present invention. FIG. 1 shows an embodiment of the pneumatic tire according to the present invention. Reference numeral 1 denotes a tread surface, and reference numeral 100 denotes a tire equator.

Five main grooves 2 each extending in a tire circumferential direction 101 are disposed in the tread surface 1 at predetermined intervals in a tire width direction. The five main grooves 2 include a single first main groove 2A, two second main grooves 2B and two third main grooves 2C. The single first main groove 2A is disposed on the tire equator 100. The two second main grooves 2B are respectively disposed on two sides of this single first main groove 2A in the tire width direction. Each of the two third main grooves 2C is disposed on an outer side of its neighboring second main groove 2B in the tire width direction. The space between the two third main grooves 2C constitutes a center area 1C of the tread surface 1, and the outer side of each third main groove 2C in the tire width direction constitutes a shoulder area 1S of the tread surface 1. In this respect, the main grooves 2 are those which run in the tire circumferential direction with a groove width of 4.0 mm to 12.0 mm, and with a groove depth of 8.0 mm to 9.5 mm.

The first main groove 2A is made of a see-through groove which extends in the tire circumferential direction 101 while bending in and out. One end of the see-through groove is capable of being seen through the see-through groove from the other end of the see-through groove when the tread surface 1 around the tire is assumed to be developed in a plane. The first main groove 2A is configured by alternately connecting straight-line parts 2A1 and tilted parts 2A2 together, and accordingly extends in the tire circumferential direction 101 with amplitude in the tire width direction. Each straight-line part 2A1 extends in a straight line in the tire circumferential direction 101. Each tilted part 2A2 is tilted from the tire circumferential direction 101. The second main grooves 2B and the third main grooves 2C each extend in a straight line in the tire circumferential direction 101.

First lateral grooves 3 each extending in a straight line in the tire width direction are disposed between the first main groove 2A and each second main groove 2B at predetermined intervals in the tire circumferential direction 101. In addition, second lateral grooves 4 each extending in a straight line in the tire width direction are disposed between each second main groove 2B and its neighboring third main groove 2C at predetermined intervals in the tire circumferential direction. The first lateral grooves 3 and the second lateral grooves 4 extend in the tire width direction while tilted from the tire width direction, but the direction at which the first lateral grooves 3 are tilted from the tire width direction is opposite to the direction at which the second lateral grooves 4 are tilted from the tire width direction.

First blocks 5 and second blocks 6 are formed in the center area 1C of the tread surface 1. Each first block 5 is defined by the first main groove 2A, one of the second main grooves 2B and each two neighboring first lateral grooves 3. Each second block 6 is defined by one of the second main grooves 2B, its neighboring third main groove 2C and each two neighboring second lateral grooves 4. The first blocks 5 are located on each of the two sides of the tire equator. The second blocks 6 are located on the outer side of each first block 5 in the tire width direction.

Each of the intervals at which the first lateral grooves 3 are disposed is set larger than each of the intervals at which the second lateral grooves 4 are disposed. Thereby, the length of each first block 5 in the tire circumferential direction is set longer than the length of each second block 6 in the tire circumferential direction. In the case of the embodiment shown in FIG. 1, each of the intervals at which the first lateral grooves 3 are disposed is set twice as long as each of the intervals at which the second lateral grooves 4 are disposed.

One sub-groove 7 extending in the tire width direction is disposed in each first block 5. One end of the sub-groove 7 communicates with its neighboring second main groove 2B, and the other end of the sub-groove 7 is located inside the first block 5. Each sub-groove 7 is configured by including a first groove part 7A and a second groove part 7B. The first groove part 7A extends in a straight line in parallel with the first lateral grooves 3, and inward from its neighboring second main groove 2B in the tire width direction. The second groove part 7B extends in a straight line from the paired first groove part 7A. Each first groove part 7A is located in the center of the corresponding first block 5 in the tire circumferential direction. The groove width of each second groove part 7B is narrower than the groove width of each first groove part 7A. Each second groove part 7B extends so as to bend from its corresponding first groove part 7A. Thus, each sub-groove 7 extends so as to bend at a bending point which is a connection part between its first groove part 7A and its second groove part 7B. Each sub-groove 7 may be configured so as to curve like an arc instead of so as to bend in this manner.

Each first block 5 includes two block portions 5A, 5B defined by the corresponding sub-groove 7. One sipe 8 extending in the tire width direction is disposed in each of the two block portions 5A, 5B. In addition, one sipe 9 extending in the tire width direction is disposed in each second block 6. The pneumatic tire according to the present embodiment aims at enhancing its braking performance on wet road surfaces by employing the edge effect brought about by these sipes 8, 9. In this respect, the sipes are slits each with a width of 0.3 mm to 1.5 mm.

One secondary groove 10 is provided outward of each third main groove 2C in the tire width direction. The groove width of the secondary groove 10 is narrower than the groove width of each third main groove 2C. The secondary groove 10 extends in a straight line in the tire circumferential direction 101. Third lateral grooves 11 each extending outward in the tire width direction from each secondary groove 10 beyond a tire contact end 102 are disposed at predetermined intervals in the tire circumferential direction 101.

A rib 12 and blocks 13 are formed in each shoulder area 1S. The rib 12 is defined by its neighboring third main groove 2C and its secondary groove 10. Each block 13 is defined by the secondary groove 10 and each two neighboring third lateral grooves 11. Notch grooves 14 are disposed in each rib 12 at predetermined intervals in the tire circumferential direction 101. Each notch groove 14 extends outward in the tire width direction from the corresponding third main groove 2C up to the halfway portion of the rib 12. By employing these notch grooves 14, the pneumatic tire according to the present embodiment aims at enhancing its drainage without decreasing its rib rigidity to a large extent.

Sipes 15 are disposed in each rib 12 so as to alternate with the notch grooves 14 at predetermined intervals in the tire circumferential direction 101. Each sipe 15 extends in the tire width direction so as to cross the rib 12 completely. In addition, each block 13 is provided with one dent 16 which is located in its outer side beyond the tire contact end 102. Two sipes 17 each extending in the tire width direction are extended from each dent 16 to the secondary groove 10. By employing the edge effect brought about by the sipes 15 and the sipes 17, the pneumatic tire according to the present embodiment aims at enhancing its braking performance of each shoulder area 1S on wet road surfaces.

The present invention above described is capable of increasing the rigidity in the tire circumferential direction of portions of the respective first blocks 5, which are located on the both sides of the tire equator 100. That is because the present invention makes the length of each first block 5 in the tire circumferential direction longer than the length of each second block 6 in the tire circumferential direction, and concurrently because the sub-groove 7 provided in each first block 5 is not allowed to communicate with the first main groove 2A. Consequently, the present invention is capable of enhancing the driving stability of the pneumatic tire during running on dry road surfaces.

On the other hand, the present invention is capable of enhancing the braking performance of the pneumatic tire on wet road surfaces. That is because the present invention makes the pneumatic tire exert the edge effect on the basis of the edge component in the tire width direction which is acquired by extending the first main groove 2A disposed on the tire equator 100 in the zigzag manner with amplitude, and concurrently because the present invention secures the drainage for the pneumatic tire by making the first main groove 2A as the see-through groove as well as by disposing the sub-groove 7 communicating with the second main groove 2B in each first block 5.

In the case of the present invention, it is desirable that the length L of each sub-groove 7 in the tire width direction should be set in a range of 50% to 80% of the width W of its corresponding first block 5. When the length L of the sub-groove 7 is shorter than 50% of the width W of the first block 5, the drainage is decreased. When the length L of the sub-groove 7 is longer than 80% of the width W of the first block 5, it is difficult to effectively increase the rigidity of portions of the respective first blocks 5, which are closer to the tire equator 100, in the tire circumferential direction. In the respect, "the width W of its corresponding first block 5" is the width of the first block 5 in the tire width direction which is measured in a location where the sub-groove 7 is disposed.

It is desirable that each sub-groove 7 should be configured by extending so as to bend or curve as described above for the purpose of making sure that the length of the sub-groove 7 is as long as possible while increasing the rigidity of the portions of the respective first blocks 5, which are closer to the tire equator 100, in the tire circumferential direction. Nevertheless, each sub-groove 7 may be configured so as to extend in a straight line from its one end to the other end.

With regard to the groove width of each sub-groove 7, it is desirable that the groove width of its first groove part 7A should be set in a range of 4.0 mm to 8.0 mm. When the groove width of the first groove part 7A is narrower than 4.0 mm, the drainage is decreased. When the groove width of the first groove part 7A exceeds 8.0 mm, the rigidity of the corresponding first block 5 is decreased. For this reason, the excessively narrow or wide groove width is undesirable for the first groove part 7A. On the other hand, it is desirable that the groove width of the second groove part 7B of each sub-groove 7 should be set in a range of 20% to 50% of the groove width of the first groove part 7A. Note that, in a case where the first groove part 7A extends with a changing groove width, the groove width of the second groove part 7B of the sub-groove 7 is set in a range of 20% to 50% of the groove width of a portion of the first groove part 7A which is open to the second main groove 2B. The groove width of each first lateral groove 3 and the groove width of each second lateral groove 4 can be set in a range of 3.0 mm to 5.0 mm.

Figure 2:
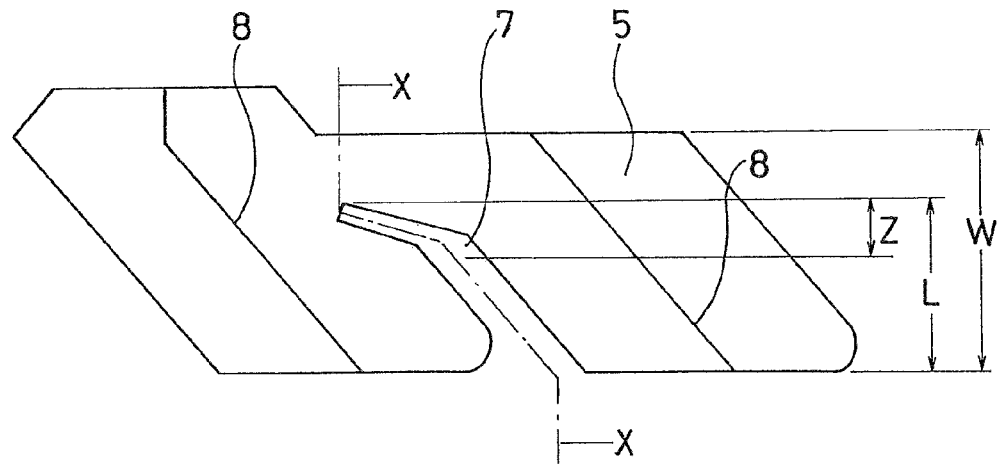
FIG. 2 is an enlarged, plan view showing a sub-groove and its vicinity part of the tread surface in FIG. 1.
Figure 3:
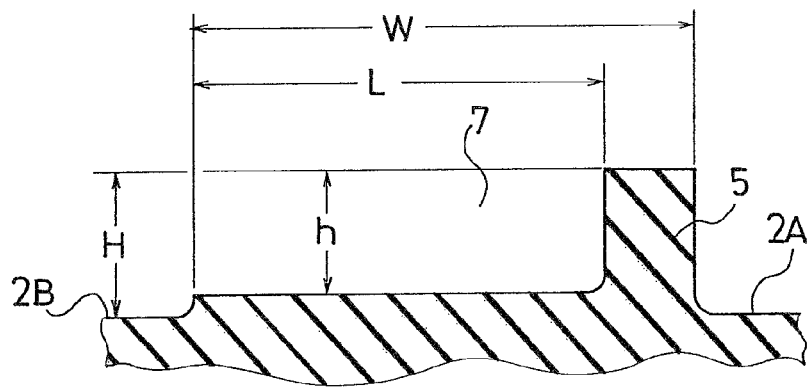
FIG. 3 is a cross-sectional view of the sub-groove and its vicinity part indicated by the arrows X-X in FIG. 2.
Figure 4:
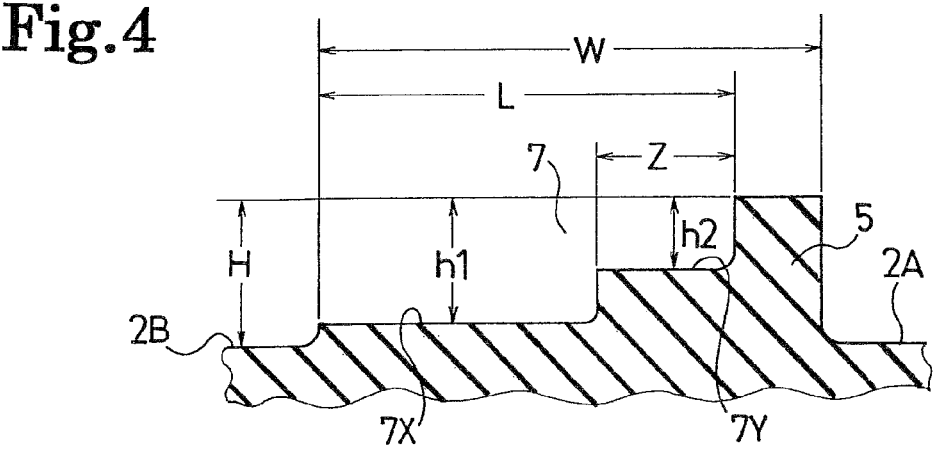
FIG. 4 is a cross-sectional view showing a modified example of the sub-groove and its vicinity part in FIG. 3.

FIG. 2 is an enlarged, plan view showing a sub-groove and its vicinity part in FIG. 1. FIG. 3 is a cross-sectional view of the sub-groove and its vicinity part indicated by the arrows X-X in FIG. 2. FIG. 4 is a cross-sectional view of a modified example of the sub-groove and its vicinity part in FIG. 3. In FIG. 3, the sub-groove 7 is shallower than the second main groove 2B, and has a substantially constant depth. In this case, it is desirable that the groove depth h of the sub-groove 7 should be 70% to 90% of the groove depth H of the second main groove 2B. When the groove depth h of the sub-groove 7 is smaller than 70% of the groove depth H of the second main groove 2B, a sufficient drainage effect cannot be obtained. On the contrary, when the groove depth h of the sub-groove 7 exceeds 90% of the groove depth H of the second main groove 2B, the rigidity of the corresponding first block 5 is decreased, and the driving stability of the pneumatic tire is accordingly decreased.

In FIG. 4, the sub-groove 7 includes: an outer side part 7X adjoining the second main groove 2B, the outer side part 7X being shallower than the second main groove 2B; and an inner side part 7Y adjoining the outer side part 7X, the inner side part 7Y being shallower than the outer side part 7X. In addition, the distance Z from a boundary between the outer side part 7X and the inner side part 7Y to the innermost end of the sub-groove 7, which is on the tire equator side, is set in a range of 15% to 40% of the length L of the sub-groove 7 in the tire width direction (see FIG. 2). If the groove depth of each sub-groove 7 is changed in this manner, it is possible to increase the driving stability without decreasing the drainage. In this respect, when the distance Z is less than 15% of the length L of the sub-groove 7 in the tire width direction, the driving stability is enhanced insufficiently. On the contrary, when the distance Z exceeds 40% of the length L of the sub-groove 7 in the tire width direction, the drainage is decreased.

It is desirable that the groove depth h1 of the outer side part 7X of the sub-groove 7 should be 70% to 90% of the groove depth H of the second main groove 2B. It is desirable that the groove depth h2 of the inner side part 7Y of the sub-groove 7 should be 35% to 65% of the groove depth H of the second main groove 2B. When the groove depth h1 of the outer side part 7X of the sub-groove 7 is less than 70% of the groove depth H of the second main groove 2B, a sufficient drainage effect cannot be obtained. On the contrary, when the groove depth h1 of the outer side part 7X of the sub-groove 7 is more than 90% of the groove depth H of the second main groove 2B, the rigidity of the corresponding first block 5 is decreased, and the driving stability is decreased. Furthermore, when the groove depth h2 of the inner side part 7Y of the sub-groove 7 is less than 35% of the groove depth H of the second main groove 2B, a sufficient drainage effect cannot be obtained. On the contrary, when the groove depth $2h$ of the inner side part 7Y of the sub-groove 7 is more than 65% of the groove depth H of the second main groove 2B, the driving stability is enhanced insufficiently.

With regard to the main grooves 2, it is desirable that the groove width Wc of each third main groove 2C should be wider than the groove width Wb of each second main groove 2B, and that the groove width Wb of the second main groove 2B should be wider than the groove width Wa of each straight-line part 2A1 of the first main groove 2A. Thereby, it is possible to increase the tread rigidity, which contributes to the driving stability, in the center area while securing the better drainage brought about by the main grooves 2.

It is desirable that the groove width W10 of each secondary groove 10 should be set in a range of 10% to 30% of the groove width Wc of each third main groove 2C. When the groove width W10 of the secondary groove 10 is narrower than 10% of the groove width Wc of the third main groove 2C, it is difficult to secure a better wet performance from the secondary grooves 10. When the groove width 10 of each secondary groove 10 is wider than 30% of the groove width Wc of each third main groove 2C, the tread rigidity of the shoulder area 1S is decreased. For this reason, the excessively narrow or wide groove width W10 is undesirable for each secondary groove 10. It is desirable that the groove width W10 of each secondary groove 10 should be set particularly in a range of 20% to 30% of the groove width Wc of each third main groove 2C.

The present invention can be preferably applied particularly to a pneumatic tire used for a sport utility vehicle (SUV) or the like, and having a tire outer diameter of 680 mm or more, as well as having an aspect ratio of 50% or more. However, the application of the present invention is not limited to such a pneumatic tire. The present invention can be applied to pneumatic tires used for various types of vehicles including recreational vehicles (RVs).

The foregoing detailed descriptions have been provided for the preferable embodiment of the present invention. It should be understood, however, that the preferable embodiment can be variously modified, substituted and replaced as long as the modifications, substitutions and replacements do not depart from the spirit or scope of the present invention which is defined by the attached scope of claims.

EXAMPLES

Tires 1 (example 1), tires 2 (example 2), tires 3 (example 3) and tires 4 (example 4) according to the present invention as well as comparative tires (comparative example) and reference tires (reference example) were produced as test tires each with a common tire size of 265/70R17. The configuration shown in FIG. 1 was applied to the tires 1, the tires 2 and the tires 3. In addition, for each of the tires 1, the tires 2 and the tires 3, the first main groove was formed as the see-through groove extending in the tire circumferential direction while zigzagging with amplitude in the tire width direction; each of the intervals at which the first lateral grooves were disposed was twice as large as each of the intervals at which the second lateral grooves were disposed; and the ratio of the length L of the sub-groove disposed in each first block to the width W of the first block was set up as shown in Table 1. The tires 4 were the same as the tires 2, except that each sub-groove was extended in a straight line. The comparative tires were the same as the tires 4, except that each sub-groove was caused to communicate with the first main groove. The reference tires were the same as the comparative tires, except that the first main groove was extended in a straight line. What were common among the test tires were that the groove width of each secondary groove was 25% of the groove width of its neighboring third main groove, and that the ratio of the groove area to the tread surface area was 35%. For each of the test tires, the groove depth of each sub-groove was equal to the groove depth of each second main groove, and no portion of the bottom of each sub-groove was raised.

Each of the test tires was mounted on the respective rims each with a rim size of 17×8J, and was inflated to have an air pressure of 200 kPa. Subsequently, each of the resultant test tires was attached to an SUV with a 6000 cc-displacement-class, and was thus tested to evaluate its wet braking performance and dry driving stability by employing the following test method. Thereby, a result shown in Table 1 was obtained.

Wet Braking Performance:

While the vehicle was running straight at a speed of 100 km/h in the wet road test course, the vehicle was braked fully. Thereby, the distance the vehicle ran before stopped was measured. For each of the test tires, the result of evaluating the measured distance was indicated by an index value in comparison with the reference tires whose index value was set at 100. A larger index value means a better braking performance on wet road surfaces.

Dry Driving Stability:

The driving stability was sensorily tested by a test driver while the test driver was driving the vehicle in a dry road test course. For each of the test tires, the result of the evaluation was indicated by an index value in comparison with the reference tires whose index value was set at 100. A larger index value means a better driving stability on dry road surfaces.

TABLE 1

|  | Example 1 | Example 2 | Example 3 | Example 4 | Comparative Example | Reference Example |
| --- | --- | --- | --- | --- | --- | --- |
| First Main Groove | Zigzagged | Zigzagged | Zigzagged | Zigzagged | Zigzagged | Not Zigzagged |
| Shape of Sub-groove | Bent | Bent | Bent | Straight | Straight | Straight |
| Length L of Sub-groove | 0.50 W | 0.65 W | 0.80 W | 0.65 W | 1.00 W | 1.00 W |
| Bottom of Sub-groove | Not raised | Not Raised | Not Raised | Not Raised | Not Raised | Not Raised |
| Braking Performance | 112 | 115 | 118 | 105 | 110 | 100 |
| Driving Stability | 115 | 110 | 105 | 110 | 100 | 100 |

It is learned from Table 1 that the tires 1, the tires 2, the tires 3 and the tires 4 according to the present invention were better in both the braking performance on wet road surfaces and the driving stability on dry road surfaces.

Tires 5 (example 5), tires 6 (example 6), tires 7 (example 7) and tires 8 (example 8) according to the present invention were produced as test tires by raising the bottom of each sub-groove in the tires 2. For each of the tires 5 and the tires 6, the bottom of each sub-groove was raised to one step. The ratio of the groove depth h of each sub-groove to the groove depth H of each second main groove was set up as shown in Table 2. For each of the tires 7 and the tires 8 according to the present invention, the bottom of each sub-groove was raised to two steps. The ratio of the groove depth h1 of the outer side part of each sub-groove to the groove depth H of each second main groove and the ratio of the groove depth h2 of the inner side part of each sub-groove to the groove depth H of each second main groove were set up as shown in Table 2.

Each of the test tires was mounted on the respective rims each with a rim size of 17×8J, and was inflated to have an air pressure of 200 kPa. Subsequently, each of the resultant test tires was attached to the SUV with a 6000 cc-displacement-class, and was thus tested to evaluate its wet braking performance and dry driving stability by employing the foregoing test method. Thereby, a result shown in Table 2 was obtained. For each of the test tires, the result of each evaluation was indicated by an index value in comparison with the reference tires whose index value was set at 100.

TABLE 2

|  | Example 5 | Example 6 | Example 7 | Example 8 |
| --- | --- | --- | --- | --- |
| First Main Groove | Zigzagged | Zigzagged | Zigzagged | Zigzagged |
| Shape of Sub-groove | Bent | Bent | Bent | Bent |
| Length L of Sub-groove | 0.65 W | 0.65 W | 0.65 W | 0.65 W |

TABLE 2-continued

|  | Example 5 | Example 6 | Example 7 | Example 8 |
|---|---|---|---|---|
| Bottom of Sub-groove | Raised | Raised | Raised | Raised |
| h/H | 0.7 | 0.9 | — | — |
| h1/H | — | — | 0.7 | 0.9 |
| h2/H | — | — | 0.35 | 0.65 |
| Braking Performance | 112 | 114 | 111 | 113 |
| Driving Stability | 113 | 111 | 114 | 112 |

It is learned from Table 2 that the tires 5, the tires 6, the tires 7 and the tires 8 according to the present invention were better in both the braking performance on wet road surfaces and the driving stability on dry road surfaces.

What is claimed is:

1. A pneumatic tire, comprising:
five main grooves each extending in a tire circumferential direction and disposed in a tread surface at predetermined intervals in a tire width direction, the five main grooves including a single first main groove, two second main grooves and two third main grooves, the single first main groove being disposed on a tire equator, the two second main grooves being respectively disposed on two sides of the first main groove in the tire width direction, and each of the two third main grooves being disposed on an outer side of its neighboring second main groove in the tire width direction;
first lateral grooves each extending in the tire width direction and disposed between the first main groove and each second main groove at predetermined intervals in the tire circumferential direction;
second lateral grooves each extending in the tire width direction and disposed between each second main groove and its neighboring third main groove at predetermined intervals in the tire circumferential direction; and
first blocks and second blocks formed in a center area of the tread surface between the two third main grooves, the first blocks being defined by the first main groove, the second main grooves and the first lateral grooves, as well as the second blocks being defined by the second main grooves, the third main grooves and the second lateral grooves; wherein
the first main groove is made of a see-through groove extending in the tire circumferential direction with amplitude in the tire width direction, one end of the see-through groove being capable of being seen through the see-through groove from the other end of the see-through groove when the tread surface around the tire is assumed to be developed in a plane,
a length of each first block in the tire circumferential direction is set longer than that of each second block in the tire circumferential direction by making the intervals of the first lateral grooves longer than the intervals of the second lateral grooves, and
one sub-groove extending in the tire width direction is disposed in each first block, and one end of the sub-groove communicates with one of the second main grooves while the other end of the sub-groove is located inside the first block, the sub-groove including an outer side part adjoining the corresponding second main groove, the outer side part being shallower than the second main groove; and an inner side part adjoining the outer side part, the inner side part being shallower than the outer side part, and
a boundary between the outer side part and the inner side part is located at a distance in a range of 15% to 40% of a length of the sub-groove in the tire width direction from an innermost end, on the tire equator side, of the sub-groove.

2. The pneumatic tire according to claim 1, wherein a length of the sub-groove in the tire width direction is 50% to 80% of a width of the corresponding first block.

3. The pneumatic tire according to claim 1, wherein the sub-groove extends in a bending or curving manner.

4. The pneumatic tire according to claim 1, wherein a groove depth of the sub-groove is 70% to 90% of a groove depth of the corresponding second main groove.

5. The pneumatic tire according to claim 1, wherein
a groove depth of the outer side part of the sub-groove is 70% to 90% of a groove depth of the corresponding second main groove, and
a groove depth of the inner side part of the sub-groove is 35% to 65% of the groove depth of the second main groove.

6. The pneumatic tire according to claim 1, wherein the intervals of the first lateral grooves are set twice as long as the intervals of the second lateral grooves.

7. The pneumatic tire according to claim 1, wherein
the second main grooves and the third main grooves extend in a straight line,
a groove width of each third main groove is set wider than that of each second main groove, and
the groove width of each second main groove is set wider than that of the first main groove.

8. The pneumatic tire according to claim 1, wherein
each first block includes two block portions defined by the sub-groove, and
a sipe extending in the tire width direction is disposed in each of the two block portions, and in each second block.

9. The pneumatic tire according to claim 1, wherein
one secondary groove is provided outward of each third main groove in the tire width direction, a groove width of the secondary groove being narrower than that of the third main groove, and the secondary groove extending in the tire circumferential direction,
third lateral grooves each extending outward in the tire width direction from the secondary groove beyond a tire contact end are disposed at predetermined intervals in the tire circumferential direction, and
a rib and blocks are formed in a shoulder area located outward of each third main groove in the tire width direction, the rib being defined by the secondary groove and the third main groove, and the blocks being defined by the secondary groove and the third lateral grooves.

10. The pneumatic tire according to claim 9, wherein a groove width of the secondary groove is 10% to 30% of a groove width of each third main groove.

11. The pneumatic tire according to claim 9, wherein notch grooves are disposed in the rib at predetermined intervals in the tire circumferential direction, each notch groove extending outward in the tire width direction from the third main groove to a halfway portion of the rib.

12. The pneumatic tire according to claim 1, wherein an outer diameter of the tire is not less than 680 mm, and an aspect ratio of the tire is not less than 50%.

* * * * *